(12) United States Patent
Nelles et al.

(10) Patent No.: US 7,893,125 B2
(45) Date of Patent: Feb. 22, 2011

(54) METHOD OF FORMING A CROSSLINKED POLYMER GEL

(75) Inventors: Gabriele Nelles, Stuttgart (DE); Silvia Rosselli, Mannheim (DE); Tzenka Miteva, Stuttgart (DE); Akio Yasuda, Esslingen (DE); Christo Tsvetanov, Sofia (BG); Rayna Stamenova, Sofia (BG); Iliyana Berlinova, Sofia (BG); Petar Petrov, Sofia (BG)

(73) Assignee: Sony Deutschland GmbH, Berlin (DE)

( * ) Notice: Subject to any disclaimer, the term of this patent is extended or adjusted under 35 U.S.C. 154(b) by 468 days.

(21) Appl. No.: 11/687,752

(22) Filed: Mar. 19, 2007

(65) Prior Publication Data

US 2009/0030102 A1    Jan. 29, 2009

(30) Foreign Application Priority Data

Mar. 31, 2006    (EP)    .................... 06006901

(51) Int. Cl.
*C08J 3/09* (2006.01)
*C08J 3/28* (2006.01)

(52) U.S. Cl. ............... 522/16; 522/40; 522/42; 522/43; 522/46; 522/75; 522/79; 522/80; 522/82; 522/85; 522/142; 524/841

(58) Field of Classification Search ................ 522/74, 522/75, 78, 79, 80, 85, 82, 16, 40, 42, 43, 522/46, 142

See application file for complete search history.

(56) References Cited

U.S. PATENT DOCUMENTS

| | | | |
|---|---|---|---|
| 3,264,202 A | 8/1966 | King | |
| 5,968,681 A * | 10/1999 | Miura et al. | 429/122 |
| 6,157,479 A * | 12/2000 | Heuer et al. | 359/265 |
| 6,280,882 B1 * | 8/2001 | Vallee et al. | 429/303 |
| 6,420,072 B1 * | 7/2002 | Maruyama et al. | 429/303 |
| 7,285,360 B2 * | 10/2007 | Maruyama et al. | 429/303 |
| 2004/0241551 A1 * | 12/2004 | Nakamura et al. | 429/303 |
| 2006/0121217 A1 * | 6/2006 | Childs et al. | 428/34.1 |
| 2008/0264867 A1 * | 10/2008 | Mika et al. | 210/679 |
| 2009/0030102 A1 * | 1/2009 | Nelles et al. | 522/40 |

FOREIGN PATENT DOCUMENTS

| DE | 101 18 639 A1 | 10/2002 |
|---|---|---|
| WO | WO 02/075748 A1 | 9/2002 |

* cited by examiner

*Primary Examiner*—Susan W Berman
(74) *Attorney, Agent, or Firm*—Oblon, Spivak, McClelland, Maier & Neustadt, L.L.P.

(57) ABSTRACT

The present invention relates to a method of forming a crosslinked polymer gel, to a polymer gel produced by such method and to uses of such polymer gel.

20 Claims, No Drawings

METHOD OF FORMING A CROSSLINKED POLYMER GEL

The present invention relates to a method of forming a crosslinked polymer gel, to a polymer gel produced by such method and to uses of such polymer gel.

Polymer gels are three-dimensional networks of flexible polymer chains, with a liquid taking up the void volume of the three dimensional network. Such polymer gels find a wide range of applications, including but not limited to batteries, electronic devices, such as solar cells, actuators and biomedical devices. Polyalkylene oxides are known as one component of polymer gel electrolytes in batteries and/or dye-sensitized solar cells. Such polymer gel electrolytes are generally composed of the polymer, redox active species and plasticizers.

Polymer gels can be enforced by crosslinking the various chains within them. Depending on the nature of the crosslinking event, physically crosslinked gels and chemically crosslinked gels are distinguished. In chemically crosslinked gels, the various polymer chains are actually covalently linked to each other or linked through a host-guest interaction, whereas in physically crosslinked gels, the polymer chains are crosslinked by non-covalent bonds, such as hydrogen bonds, van der Waals forces or hydrophobic or ionic interactions. In dye sensitized solar cells until now, usually physically crosslinked gels are being used. However, because the solvent used in such physically crosslinked gels is usually volatile, physically crosslinked polymer gels are reported to have a poor long-term stability. One way of overcoming this problem of long-term stability is the attempt to use chemically crosslinked polymer gels, wherein part of their better long-term stability is achieved by a covalently bonded three-dimensional network of polymer chains. As far as polymer electrolyte to use in solar cells are concerned, polyalkylene oxide polymer and more specifically polyethylene oxides is most often used. However, the known chemically crosslinked polymer alkoxide are produced in aqueous solution and cannot be used in electronic devices which are usually water sensitive.

Crosslinking of polyethylene oxide was first reported by King in U.S. Pat. No. 3,264,202 in 1966, wherein crosslinking is brought about by irradiating with gamma irradiation of dilute aqueous solutions of polyethylene oxide. More recently, Doytcheva et al. reported the crosslinking of polyethylene oxide in the solid state by using ultraviolet irradiation in the presence of photo initiators (J. Appl. Polym. Sci. 64, 2299 (1997)) and the crosslinking of polyethylene oxide in aqueous solution (Macromol. Mater. Eng. 2004, 289, 676).

However, none of the these chemically crosslinked polyalkylene oxides can be used in batteries and/or in polymer gel electrolytes within electronic devices, such as solar cells, for the aforementioned reasons. Furthermore none of the physically crosslinked polyalkylene oxide gels show a good long-term stability. Chemically crosslinked PEO in the solid state is not amenable for further use.

Accordingly, it was an object of present invention to provide for a method allowing the production of a chemically crosslinked polyalkylene oxide gel that can be used in an electronic device. Furthermore, it was an object of the present invention to provide for a method allowing the production of a polymer gel which shows a better long-term stability upon use in an electronic device such as a solar cell, than the polymer gels used therein previously.

All these objects are solved by a method of forming a crosslinked polymer gel comprising the steps:

a) providing at least one type of polymer selected from polyalkylene oxide, polyglycidyl ether and polyarylene oxide, and a crosslinking agent, in any order, b) mixing said at least one type of polymer and said crosslinking agent with an organic solvent, thus producing a solution or suspension or emulsion of said at least one type of polymer and of said crosslinking agent in said organic solvent, c) irradiating said solution or suspension or emulsion for performing a crosslinking reaction.

In a preferred embodiment, said at least one type of polymer is soluble in said organic solvent, and a solution of said at least one type of polymer in said organic solvent is produced.

Preferably step c) is performed by irradiating with γ-radiation and/or UV-radiation.

In one embodiment the method according to the present invention further comprises the step: a1): providing a photoinitiator and mixing said photoinitiator with said organic solvent of step b), which step a1) is performed before step c).

In one embodiment step c) is performed by irradiating with UV-radiation, preferably in the range of from 200 nm to 400 mm.

In one embodiment said organic solvent does not chemically react in the crosslinking reaction of step c).

In one embodiment said at least one type of polymer is polyalkylene oxide, polyarylene oxide, polyglycidyl ether, a mixture of polyalkylene oxide, polyarylene oxide and polyglycidyl ether, a mixture of polyalkylene oxide and/or polyarylene oxide and/or polyglycidyl ether, a copolymer of alkylene oxide and/or arylene oxide, and/or glycidyl ether, or a copolymer of polyalkylene oxide and polyarylene oxide, wherein, preferably, said polymers are random, block or multiblock polymers in their structure.

In a preferred embodiment said at least one type of polymer is polyethylene oxide and/or poly(ethylene oxide-co-propylene oxide).

In one embodiment said organic solvent is capable of dissolving said at least one type of polymer, wherein, preferably said organic solvent is a non-aqueous solvent, and wherein, more preferably, said organic solvent is selected from the group comprising γ-butyrolactone, propylene carbonate, ethylene carbonate, and a mixture of propylene carbonate and ethylene carbonate, other highly polar aprotic solvents like N-methylpyrrolidone (NMP), 1,3-dimethyl-2-imidazolidinone (DMI), acetonitrile, N,N-dimethyl-formamide (DMF), dimethylsulfoxide (DMS), methoxypropionitrile, Pluronic® surfactant and oligomers like polyethyleneglycol (PEG).

In one embodiment step c) is performed in the absence of water or in the absence of an aqueous solution.

Preferably, said crosslinking agent is a copolymer in said at least one type of polymer, or said crosslinking agent is selected from the group comprising pentaerythritol triacrylate (PETA), pentaerythritol tetraacrylate (PETA-4), N,N'-methylenebisacrylamide (MBAAm), tetra(ethyleneglycol)dimethacrylate (TEGDMA), oligo(ethyleneglycol)diacrylate, poly(ethyleneglycoldi(meth)acrylate and trimethylolpropane trimethacrylate (TMPTMA).

In one embodiment said at least one type of polymer is dissolved in said organic solvent at a concentration of 1 to 20 wt. %, preferably 1 to 10 wt. %, more preferably 1 to 8 wt. %, and most preferably 2 to 6 wt. %.

Preferably, said photoinitiator is selected from the group of alkyl and aromatic ketones comprising benzophenone, benzoin, acetophenone, 4,4-Bis(dimethylamino)benzophenone, benzoin methyl ether, [2-hydroxy-2-methyl-1-phenylpropan-1-one], [1-(4-dodecylphenyl)-2-hydroxy-2-methylpropan-1-one], [1-(4-isopropylphenyl)-2-hydroxy-2-methylpropan-1-one] and a mixture of 2-(1-methylethyl)-9H-thioxanthen-9-one, 2-hydroxy-2-methyl-1-phenylpropan-1-one and camphorquinone.

Preferably, said irradiating occurs with a power in the range of from 1 mW/cm² to 300 mW/cm² or with an irradiance dose of 1 J/cm² to 50 J/cm².

In one embodiment the method according to the present invention further comprises the step: d) removing said organic solvent from the product of c) by drying said product of c), wherein, preferably the method further comprises the step e) imbibing the product of step d) in an organic or aqueous solvent.

In one embodiment a crosslinked polymer gel produced by the method according to the pre-sent invention and is characterized by at least one of, preferably all of the following features: a storage modulus G' in the range of from 1 Pa to 10 MPa, preferably from 10 Pa to 1000 Pa, most preferably from 150 Pa to 300 Pa; a gel fraction yield, GF, in the range 60-100%; an equilibrium degree of swelling (ES) in organic solvent in the range between 20-150, preferably 40-80, and a molecular weight between crosslinks ($M_c$) between 10 000 and 20 000.

The objects of the present invention are also solved by a solar cell comprising a crosslinked polymer gel according to the present invention.

The objects of the present invention are also solved by the use of a polymer gel according to the present invention in an electronic device, such as a solar cell, or in a battery, or as a chemomechanical, thermomechanical or photomechanical actuator.

As used herein, the term polyalkylene oxide is meant to denote an entity having the formula $(C_nH_2,—O)_{n'}—$, wherein $n \geq 2$ and n' is in the range of from 3 to approximately 100.000. As used herein, the term "polyarylene oxide" is meant to denote an entity having the formula

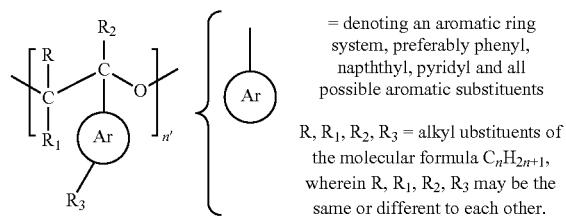

= denoting an aromatic ring system, preferably phenyl, napththyl, pyridyl and all possible aromatic substituents R, R₁, R₂, R₃ = alkyl ubstituents of the molecular formula $C_nH_{2n+1}$, wherein R, R₁, R₂, R₃ may be the same or different to each other.

wherein $n \geq 0$, and n' is in the range of from 3 to approximately 100,000.

As used herein, the term "organic solvent" is meant to denote a solvent the chemical formula of which contains at least one or several carbon atoms. Non-limiting examples for organic solvents are: hydrocarbons and halogenated hydrocarbons, alcohols, glycols, ethers and glycol ethers, ketones, esters, lactones, amides and N-containing compounds such as dimethylformamide, pyridine, acetonitrile, sulfur containing compounds such as DMSO.

As used herein, the term "aqueous solution" is meant to denote a solution wherein water is one solvent or the solvent. As used herein, the term "storage modulus G'" is meant to describe and exemplify the elastic properties of the gel. The storage modulus G' and loss modulus G" can be measured by dynamic oscillation rheology (e.g. using a rheometer with the following set-up: rheometer ThermoHaake Rheostress 600, cone-plate; cone: angle=1.968°, gap=0.103 mm, diameter=35.015 mm, volume=0.4 cm³). As used herein, the term "gel fraction yield, GF," is meant to denote the ratio of the dried gel weight to the weight of polymer in 3 ml solution (0.15 g). As used herein, the term "equilibrium degree of swelling, ES," is meant to denote the weight of equilibrated swollen sample to weight of dry sample.

As used herein, the term "molecular weight between crosslinks, Mc," is defined by the formula $M_c=3$.

$$\frac{\rho RT}{E} \cdot \varphi^{1/3},$$

where the Young modulus E is equal to 3 G', ρ is the bulk density and φ denotes the equilibrium volume fraction of a polymer in the swollen state.

The inventors have surprisingly found that it is possible to produce chemically crosslinked polyalkylene oxide and/or polyarylene oxide gels in an organic solvent and thereby produce chemically crosslinked gels that can be easily used in devices which are water sensitive, such as electronic devices, for example solar cells. Furthermore, the gels according to the present invention are free standing polymer gels which can therefore be applied to flexible substrates. The gels produced by the method according to the present invention are easy to handle and have a long-term stability.

It is clear to someone skilled in the art that the at least one type of polymer selected from polyalkylene oxide, polyarylene oxide and polyglycidyl ether used according to the present invention may be a polymer or copolymer of different alkylene oxides and/or glycidyl ethers and/or arylene oxides. Moreover, if it is a copolymer, it may have a block or random or multiblock structure. In one embodiment, the polymer is grafted, for example with other polymers or oligomers, such as polyethylene glycol or oligoethylene glycol of various molecular weights, for example in the range of from 300 to 20,000, or preferably from 400 to 4,000.

Preferably, the at least one type of polymer used in the method according to the present invention has a molecular weight in the range of from 1000 to 5,000,000. The gel prepared using the method according to the present invention is a "free standing" gel, which means that it adopts and retains the shape that it originally had. In accordance therewith, it may have a variety of shapes, for example a film, the thickness of which may be easily controlled. Usually, the strength, rigidity, viscosity and further characteristics of the gel, such as the charge trans-port capability, may be controlled by adjusting the respective polymer concentration.

From the results reported below, it becomes clear that, upon use of such organogel in a solar cell, it has a better long-term stability, contributing to the long-term efficiency of such device. This was hitherto impossible because of the "aqueous" nature of the polyalkylene oxide gels in the prior art and/or because of the difficult handling of crosslinked polyalkylene oxide in the solid state. Hence, the inventors have opened up new possibilities of producing polyalkylene oxide/polyarylene oxide polymer gels that can be used in electronic devices, such as solar cells, lithium batteries, etc.

Reference is now made to the following examples, which are given to illustrate, not to limit the invention:

EXAMPLES

Example 1 a) Preparation of a Solution of PAO (Polyalkyleneoxide), PArO (Polyaryleneoxide) and/or their Copolymer in Organic Solvent;

The polymer was added to an organic solvent like γ-butyrolactone, propylene carbonate, ethylene carbonate or mixture propylene carbonate/ethylene carbonate (PC/EC) in a 25 ml beaker equipped with a stirrer and a gas inlet tube. The mixture was stirred at 65° C. under argon until complete dissolution and left to stay overnight. A definite amount of initiator, e.g. benzophenone (BPh) and crosslinking agent (very often 5 wt % with respect to the polymer), dissolved in the solvent (typically 1 ml), was added to the solution under stirring. Preferred ratio initiator/crosslinking agent was 1:4 or 1:9.

b) Cross Linking of the Polymer Solution by UV Radiation;

An aliquot of polymer solution (5 ml) was poured into a Teflon Petri dish with a glass plate (50 mm×50 mm×1.6 mm) forming a thin layer which were purged with argon for 5 min, and then UV irradiated with Dymax 5000-EC UV curing equipment with a 400-Watt flood lamp system at a distance of about 7 cm (below bottom edge of lamp/reflector assembly housing). Irradiation time: 2 min. Irradiance power: 94 mW/cm$^2$; irradiance dose for 2 min: 11.03 J/cm$^2$.

Very thin gel samples (ca.0.1 mm) onto glass support were prepared with this method using PEO, PEG and PEO copolymers like random and block poly(ethylenoxide-co-propylenoxide), P(EO-co-PO), random and block poly(ethylenoxide-co-butylenoxide), P(EO-co-BO), random and block poly (ethylenoxide-co-styreneoxide), P(EO-co-StO). As crosslinking agents pentaerythritol triacrylate (PETA), pentaerythritol tetraacrylate (PETA-4), N,N'-methylenebisacrylamide (MBAAm), tetra(ethylene glycol) dimethacrylate (TEGDMA) and trimethylolpropane trimethacrylate (TMPTMA) were used. The gels have very good dimensional stability and do not leak solvent when stored, which implies better solvent keeping in chemically cross-linked polymer compared to physical cross-linked gels. Most of the photo-initiating system (BPh and crosslinking agent) remains chemically bonded in the polymer networks.

Example 2

1. UV Crosslinking of PEO and Copolymer Solution in EC/PC (50:50 wt. %)

a) 5 wt. % solution of PEO in the solvent was prepared as follows: 0.75 g PEO were added to the solvent (14 ml) in a 50 ml glass beaker equipped with a stirrer and gas inlet tube. The mixture was stirred at 65° C. under argon until homogeneous solution was obtained and it was left to stay overnight. A definite amount (BPh+PETA) (very often 5 wt. % to PEO) dissolved in the solvent (1 ml) was added to the solution under stirring. Preferred ratio BPh/PETA was 1:4.

b) Aliquots of PEO or copolymer solutions (3 ml) were poured into two Teflon Petri dishes (Ø64 mm) forming ca.0.9 mm thick layers which were purged with argon for 5 min, then UV irradiated with Dymax 5000-EC UV curing equipment with a 400-Watt flood lamp system at a distance of about 7 cm (below bottom edge of lamp/reflector assembly housing). Irradiation time: 2 min. Irradiance power: 94 mW/cm$^2$; irradiance dose for 2 min: 11.03 J/cm$^2$.

The gels were characterised by determining the gel fraction yield, GF, as a ratio of the dried gel weight to the weight of polymer in 3 ml solution (0.15 g), and the equilibrium degree of swelling, ES, as weight of equilibrated swollen sample to weight of dry sample. Storage modulus G' and loss modulus G" were measured on a rheometer ThermoHaake Rheostress 600, cone-plate; cone: angle=1.968°, gap=0.103 mm, diameter=35.015 mm, volume=0.4 cm$^3$.

TABLE 1

UV crosslinking of PEO solution in PC/EC (50:50 wt. %) in the presence of BPh/PETA
5 wt. % (BPh/PETA = 1/4); RT; 20 min. irrad. under argon

| Sample volume* | Sample thickness | | ES | |
|---|---|---|---|---|
| ml | mm | GF, % | $H_2O$ | $CHCl_3$ |
| 10 | 3.1 | 86 | 47 | 95 |
| 5 | 1.5 | 80 | 54 | 118 |
| 3 | 0.9 | 76 | 72 | 108 |

2. UV Crosslinking of PEO and PEG Mixed Solution in γ-butyrolactone GBL a) 5 wt. % solution of PEO in γ-butyrolactone was prepared as follows: 0.75 g PEO and a definite amount of PEG (5 wt. % and 10 wt. % to PEO) were added to the solvent (14 ml) in a 50 ml beaker equipped with a stirrer and a gas inlet tube. The mixture was stirred at 65° C. under argon until homogeneous solution was obtained. After staying overnight a definite amount (BPh+PETA) dissolved in 1 ml solvent was added to the solution and homogenized under stirring. Preferred ratio BPh/PETA was 1:9.

b) see example 1

TABLE 2

UV crosslinking of PEO mixed with PEG's of different molecular weights in GBL solution
5 wt. % PEO (MW = 1 × 10$^6$) + 5 wt. % PEG;
10 wt. % (BPh/PETA = 1:9); volume: 5 ml;
layer thickness: 1.5 mm; RT; irradiation time: 10 min. under Ar or 1 min with Dymax flood UV lamp
PEG 2000 and 4000 exert a measurable increase of GF yield, which indicates some PEG grafting onto PEO chains of the network.
All gels containing PEG have good dimensional

| PEG | | ES | | G' |
|---|---|---|---|---|
| molecular weight: | GF*, % | $H_2O$ | $CHCl_3$ | Pa |
| 400 | 93 | 31 | 71 | 101 |
| 600 | 92 | 31 | 73 | 90 |
| 1000 | 94 | 36 | 72 | 89 |
| 2000 | 107 | 31 | 61 | 118 |
| 4000 | 104 | 30 | 59 | 78 |
| 550 PEG-monoacrylate (1 wt %) | 91 | 21 | 38 | 108 |
| 550 PEG-monoacrylate (2 wt %) | 88 | 25 | 54 | 72 | stability and do not leak solvent, which implies better solubility of the polymer system in the solvent.

3. Use of Crosslinked PEO in Dye Sensitised Solar Cell (DSSC)

A DSSC is assembled as follows: 30 nm thick bulk $TiO_2$ blocking layer is formed on FTO (approx. 100 nm on glass). A 10 micron thick porous layer of particles of 10 nm diameter on average is screen printed on the blocking layer and sintered at 450 degree for half an hour. Red dye N3 is adsorbed to the particles via self-assembling out of a solution in ethanol (0.3 mM) and the porous layer is covered with a free standing crosslinked PEO gel electrolyte containing $I^-/I_3^-$ as redox couple (0.015 mM). A reflective platinum back electrode is attached with a distance of 6 microns from the porous layer.

Results:

The efficiency $\eta$ of a DSSC made with a chemically crosslinked PEO according to the present invention, of a DSSC made with a physical cross-linked PEO according to the prior art and of a DSSC made with a chemically cross-linked PEO in a non-organic solvent (e.g. water) are reported in the table below. Light intensity of the simulated solar irradiation (AM1.5) was 100 mW/cm$^2$, irradiated area of the DSSC was 0.25 cm$^2$.

Table 3: Characteristic of DSSC

TABLE 3

Characteristic of DSSC

| Sample | Efficiency, $\eta$, at different days after fabrication | | | | |
|---|---|---|---|---|---|
| | 1 day | 12 days | 23 days | 40 days | 64 days |
| Physically cross-linked PEO in PC:EC (50:50 wt %) | 6.83 | 5.05 | 1.35 | — | — |
| Cross-linked PEO in PC:EC (50:50 wt %), 5 wt % BPh/MBAAm 1:4 | 7.76 | 7.38 | 5.97 | 4.34 | 2.55 |
| Cross-linked PEO in water, 5 wt % BPh/MBAAm 1:4, dried and reswollen PC:EC (50:50 wt %), | 7.11 | 6.18 | 2.45 | 1.96 | 1.77 |

The results clearly illustrate that the chemically crosslinked gels according to the present invention are more stable over a longer period of time in comparison to prior art gels. This is particularly the case for a period up to 40 days after fabrication where the DSSC with a physically cross-linked gel does not function at all, and the DSSC according to the present invention has a far better efficiency than the DSSC having a cross-linked PEO in water (4.34 vs. 1.96)

Example 3

Preparation of Poly(Ethylene Oxide) (PEO) Organogels According to the Invention 0.75 g of poly(ethylene oxide), having a molecular weight of 1,000,000, are added to 14 ml solvent of ethylene carbonate/propylene carbonate 50:50 in weight while stirring vigorously at 65° C. under argon. A definite amount benzophenone (BPh)/N,N'-methylenebisacrylamide (MBAAm) at two ratios: 1:9 and 1:4 dissolved in 1 ml of the solvent was added to the solution under stirring. The homogeneous viscous solution was poured into a glass Petri dish until a maximum layer thickness of 0.9 mm was obtained.

The samples were irradiated at 25° C. for 2 minutes with the aid of a 400 W flood mercury lamp which emits white light, with irradiance power 94 mW/cm$^2$ and irradiance dose of 11.03 J/cm$^2$.

A whole range of organogels with different amount of photoinitiating system (BPh+MBAAm) was thus prepared.

The properties of swelling at equilibrium SE (=equilibrium degree of swelling ES, see above), the gel fraction properties GF and the storage modulus G' and loss modulus G" of the gels were measured and the results obtained are indicated in Table 4 below.

TABLE 4

Characteristics of crosslinking of PEO solutions in ethylene carbonate/propylene carbonate 50:50 in weight, crosslinked by UV, as a function of the cross-linking agent N,N'-methylenebisacrylamide concentration
$M_w = 1 \times 10^6$; degree of crystallinity: 67%

| | BPh + MBAAm Wt. % | | | | | |
|---|---|---|---|---|---|---|
| | 3 | 5 | 8 | 10 | 12 | 15 |
| a. benzophenone:N,N'-methylenebisacrylamide = 1:9 | | | | | | |
| GF, % | 63 | 78 | 81 | 89 | 93 | 89 |
| ES(H$_2$O) | 60 | 40 | 36 | 24 | 23 | 26 |
| ES(CHCl$_3$) | 129 | 69 | 63 | 40 | 39 | 37 |
| G', Pa | 42 | 69 | 67 | 121 | 162 | 172 |
| G", Pa | 6 | 8 | 15 | 13 | 13 | 36 |
| b. benzophenone:N,N'-methylenebisacrylamide = 1:4 | | | | | | |
| GF, % | 76 | 84 | 86 | 89 | 92 | 99 |
| ES(H$_2$O) | 42 | 35 | 33 | 27 | 29 | 22 |
| ES(CHCl$_3$) | 69 | 62 | 56 | 47 | 46 | 35 |
| G', Pa | 77 | 97 | 169 | 200 | 260 | 295* |
| G", Pa | 7 | 9 | 11 | 14 | 10 | 15 |

*the sample was cracked

As Table 4 shows, if a comparison is made between organogels, obtained with different content of a photoinitiating system (BPh/MBAAm), it appears clearly that the gel fraction only increases, the swelling at equilibrium decreases which indicate gradually increase of crosslinking density, and storage modulus increases implying improved elasticity of the organogels.

Example 4

Preparation of Poly(Ethylene Oxide) (PEO)/Poly(Ethylene Glycol) (Peg) Organogels According to the Invention 0.75 g of poly(ethylene oxide), having a molecular weight of 1,000,000, and 5 wt. % or 10 wt. % to PEO poly(ethylene glycol) of molecular weight 2000 (PEG2000) are added to 14 ml solvent of ethylene carbonate/propylene carbonate 50:50 in weight, while stirring vigorously at 65° C. under argon. A definite amount benzophenone (BPh)/N,N'-methylenebisacrylamide (MBAAm) at ratio 1:4 dissolved in 1 ml of the solvent was added to the solution under stirring. The homogeneous viscous solution was poured into a glass Petri dish until a maximum layer thickness of 0.9 mm was obtained.

The samples were irradiated at 25° C. for 2 minutes with the aid of a 400 W flood mercury lamp with irradiance power 94 mW/cm$^2$ and irradiance dose of 11.03 J/cm$^2$.

A whole range of organogels with different amount of photoinitiating system (BPh+MBAAm) at ratio BPh/MBAAm=1:4 was thus prepared.

The properties of swelling at equilibrium ES (=equilibrium degree of swelling, see above), the gel fraction properties GF and the storage modulus G' and loss modulus G" of the gels were measured and the results obtained are indicated in Table 5 below.

TABLE 5

Characteristics of crosslinking of PEO-PEG2000 mixed solutions in ethylene carbonate/propylene carbonate 50:50 in weight, cross-linked by UV, as a function of the crosslinking agent N,N'-methylenebis-acrylamide concentration at a ratio: benzophenone/N,N'-methylenebisacrylamide = 1:4
$M_w = 1 \times 10^6$; degree of crystallinity: 67%

| | PEG 2000 content, wt. % | | | | | |
|---|---|---|---|---|---|---|
| | 5 | | | 10 | | |
| | BPh + MBAAm wt. % | | | | | |
| | 5 | 8 | 10 | 5 | 8 | 10 |
| GF % | 89 | 89 | 97 | 85 | 92 | 94 |
| ES H$_2$O | 39 | 30 | 24 | 38 | 31 | 29 |
| ES CHCl$_3$ | 64 | 61 | 41 | 71 | 52 | 60 |
| G', Pa | 106 | 159 | 214 | 113 | 145 | 12 |
| G", Pa | 6 | 15 | 11 | 4 | 12 | 6 |

Making the comparison between the organogels containing 5 and 10 wt. % (Table 5), it is clear that gels with 5 wt. % PEG have better swelling properties and elasticity manifested by higher values of storage and loss moduli.

Thus, the method of the invention leads to novel products which are organogels of poly(ethylene oxide) with or without a small addition of poly(ethylene glycol) which possess properties which are of considerable interest, such as a swelling proportion and/or an elastic behavior comparable to best PEO hydrogels known up to now.

Example 5

Preparation of Organogels of Copolymers of Ethylene Oxide According to the Invention Random high molecular weight amphiphilic copolymers, of various poly(ethylene oxide)/poly(propylene oxide) ratios, were used. The low crystalline copolymers P(EO-co-PO) were synthesized by anionic suspension polymerization with Ca amide/alkoxide catalyst. Ethylene oxide was bubbled through the reaction mixture at strictly controlled intervals of time (feeding cycles) at a certain temperature.

After purification and characterization, these copolymers were used for the preparation of solutions in ethylene carbonate/propylene carbonate 50:50 in weight (EC/PC), which are crosslinked according to the invention.

0.75 g of poly(ethylene oxide-co-propylene oxide) (P(EO-co-PO)), having a molecular weight up to about 500,000, are added to 14 ml solvent of ethylene carbonate/propylene carbonate 50:50 in weight while stirring vigorously at 65° C. under argon. A definite amount benzophenone (BPh)/N,N'-methylenebisacrylamide (MBAAm) at ratio 1:4 dissolved in 1 ml of the solvent was added to the solution under stirring. The homogeneous viscous solution was poured into a glass Petri dish until a maximum layer thickness of 0.9 mm was obtained.

The samples were irradiated at 25° C. for 2 minutes with the aid of a 400 W flood mercury lamp which emits white light, with irradiance power 94 mW/cm$^2$ and irradiance dose of 11.03 J/cm$^2$.

A whole range of P(EO-co-PO) organogels with different amount of photoinitiating system (BPh+MBAAm) at ratio BPh/MBAAm=1:4 was thus prepared.

The properties of swelling at equilibrium, the gel fraction properties and the storage modulus and loss modulus of the gels were measured and the results obtained are given in Table 6A, for the organogels of random P(EO-co-PO) sample of PO content 20 mol % and $M_w$=120 000;

in Table 6B, for the organogels of random P(EO-co-PO) sample of PO content 19 mol % and $M_w$=160 000;

in Table 6C, for the organogels of random P(EO-co-PO) sample of PO content 22 mol % and $M_w$=300 000;

in Table 6D, for the organogels of random P(EO-co-PO) sample of PO content 21 mol % and $M_w$=200 000;

in Table 6E, for the organogels of random P(EO-co-PO) sample of PO content 27 mol % and $M_w$=460 000;

TABLE 6A

[PO] = 20 mol %; $M_w$ = 120 000; degree of crystallinity: 15%

| | BPh + MBAAm Wt. % | | | | |
|---|---|---|---|---|---|
| | 5 | 8 | 10 | 12 | 15 |
| GF, % | 77 | 86 | 79 | 95 | 99 |
| ES(H$_2$O) | 35 | 32 | 33 | 26 | 25 |
| ES(CHCl$_3$) | 52 | 56 | 51 | 42 | 37 |
| G', Pa | 86 | 97 | 116 | 180 | 183 |
| G", Pa | 8 | 20 | 15 | 15 | 14 |

TABLE 6B

[PO] = 19 mol %; $M_w$ = 160 000; degree of crystallinity: 15%

| | BPh + MBAAm Wt. % | | | | |
|---|---|---|---|---|---|
| | 5 | 8 | 10 | 12 | 15 |
| GF, % | 77 | 83 | 79 | 94 | 99 |
| ES(H$_2$O) | 34 | 30 | 32 | 27 | 24 |
| ES(CHCl$_3$) | 42 | 39 | 37 | 44 | 38 |
| G', Pa | 57 | 67 | 104 | 142 | 208 |
| G", Pa | 6 | 15 | 15 | 18 | 16 |

TABLE 6C

[PO] = 22 mol %; $M_w$ = 300 000; degree of crystallinity: 17%

| | BPh + MBAAm Wt. % | | | | |
|---|---|---|---|---|---|
| | 5 | 8 | 10 | 12 | 15 |
| GF, % | 81 | 89 | 87 | 93 | 100 |
| ES(H$_2$O) | 39 | 29 | 33 | 27 | 26 |
| ES(CHCl$_3$) | 57 | 50 | 58 | 44 | 40 |
| G', Pa | 58 | 112 | 163 | 188 | 187 |
| G", Pa | 13 | 17 | 12 | 17 | 11 |

TABLE 6D

[PO] = 21 mol %; $M_w$ = 200 000; degree of crystallinity: 24%

| | BPh + MBAAm Wt. % | | | | |
|---|---|---|---|---|---|
| | 5 | 8 | 10 | 12 | 15 |
| GF, % | 80 | 90 | 88 | 94 | 100 |
| ES(H$_2$O) | 39 | 29 | 33 | 27 | 26 |
| ES(CHCl$_3$) | 57 | 50 | 58 | 44 | 40 |
| G', Pa | 96 | 109 | 113 | 177 | 197 |
| G", Pa | 5 | 12 | 12 | 10 | 19 |

TABLE 6E

| [PO] = 27 mol %; $M_w$ = 460 000; degree of crystallinity: 11% | | | | | |
|---|---|---|---|---|---|
| | BPh + MBAAm Wt. % | | | | |
| | 5 | 8 | 10 | 12 | 15 |
| GF, % | 81 | 91 | 89 | 93 | 99 |
| ES(H$_2$O) | 35 | 30 | 33 | 26 | 22 |
| ES(CHCl$_3$) | 58 | 45 | 42 | 39 | 37 |
| G', Pa | 91 | 126 | 139 | 161 | 207* |
| G", Pa | 9 | 13 | 14 | 13 | 15 |

Optimal properties are exhibited by P(EO-co-PO) organogels with 8, 10, and 12 wt. % content of the photoinitiating system (BPh/MBAAm) in the initial solution.

Organogels prepared from copolymers of highest molecular weight have better elasticity manifested by higher values of storage and loss moduli.

Making the comparison between the organogels prepared from copolymers P(EO-co-PO) with different molecular weights (Tables 6A-6E) and from pure PEO of molecular weight 1×10$^6$ (Table 4), the results relating to the gel fraction demonstrate the fact that the copolymers are less efficient than the pure PEO in terms of photo-initiated cross-linking.

The features disclosed in the specification, and/or the claims may, both separately, and in any combination thereof, be material for realising the invention in various forms thereof.

The invention claimed is:

1. A method of producing a crosslinked polymer gel comprising:
    a) mixing at least one polymer with an organic solvent to produce a polymer solution, suspension or emulsion, wherein said at least one polymer is selected from the group consisting of: polyarylene oxide; a mixture of polyarylene oxide and at least one of polyalkylene oxide and polyglycidyl ether; and a copolymer of polyarylene oxide and at least one of polyalkylene oxide and polyglycidyl ether;
    b) dissolving a photoinitiator and a crosslinking agent in said organic solvent to produce a photoinitiator/crosslinking agent solution;
    c) mixing said photoinitiator/crosslinking agent solution with said polymer solution, suspension or emulsion to produce a crosslinkable solution, suspension or emulsion; and
    d) crosslinking said crosslinkable solution, suspension or emulsion with γ-radiation and/or ultraviolet (UV)-radiation to produce said crosslinked polymer gel, wherein said organic solvent is not a chemical reactant in said crosslinking.

2. The method according to claim 1, wherein said crosslinking is performed by irradiating with ultraviolet (UV)-radiation.

3. The method according to claim 2, wherein the crosslinking reaction is performed by irradiating with ultraviolet (UV)-radiation at a wavelength of 200-400 nm.

4. The method according to claim 1, wherein said organic solvent is capable of dissolving said at least one polymer.

5. The method according to claim 4, wherein said organic solvent is a non-aqueous solvent.

6. The method according to claim 5, wherein said organic solvent is selected from the group consisting of γ-butyrolactone, propylene carbonate, ethylene carbonate, and a mixture of propylene carbonate and ethylene carbonate, N-methylpyrrolidone (NMP), 1,3-dimethyl-2-imidazolidinone (DMI), acetonitrile, N,N-dimethyl-formamide (DMF), dimethylsulfoxide (DMS), methoxypropionitrile, a copolymer surfactant of ethylene oxide and propylene oxide, and polyethyleneglycol (PEG).

7. The method according to claim 1, wherein said crosslinking is performed in the absence of water or in the absence of an aqueous solution.

8. The method according to claim 1, wherein said crosslinking agent is selected from the group consisting of pentaerythritol triacrylate (PETA), pentaerythritol tetraacrylate (PETA-4), N,N'-methylenebisacrylamide (MBAAm), oligo(ethyleneglycol)diacrylate, poly(ethyleneglycoldi(meth)acrylate, tetra(ethyleneglycol)dimethacrylate (TEGDMA) and trimethylolpropane trimethacrylate (TMPTMA).

9. The method according to claim 1, wherein said at least one polymer is dissolved in said organic solvent at a concentration of 1-20 wt. %.

10. The method according claim 1, wherein said photoinitiator is selected from the group consisting of benzophenone, benzoin, acetophenone, 4,4-Bis(dimethylamino)benzophenone, benzoin methyl ether, 2 hydroxy-2-methyl-1-phenyl-propan-1-one, 1-(4-dodecylphenyl)-2-hydroxy-2-methyl-propan-1-one, 1-(4-isopropylphenyl)-2-hydroxy-2-methylpropan-1-one, and a mixture of 2-(1-methylethyl)-9H-thioxanthen-9-one, 2-hydroxy-2-methyl-1-phenylpropan-1-one, and camphorquinone.

11. The method according claim 1, wherein said crosslinking is performed with an irradiance power of 1-300 mW/cm$^2$ or with an irradiance dose of 1-50 J/cm$^2$.

12. The method according to claim 1, further comprising:
    e) drying said crosslinked polymer gel obtained from said crosslinking d) to remove said organic solvent therefrom.

13. The method according to claim 12, further comprising:
    f) imbibing said crosslinked polymer gel obtained from said drying e) in an organic or aqueous solvent.

14. The method according to claim 1, wherein the at least one polymer is polyarylene oxide.

15. The method according to claim 1, wherein the at least one polymer is a mixture of polyarylene oxide and at least one of polyalkylene oxide and polyglycidyl ether.

16. The method according to claim 1, wherein the at least one polymer is a copolymer of polyarylene oxide and at least one of polyalkylene oxide and polyglycidyl ether.

17. The method according to claim 1, wherein said at least one polymer is dissolved in said organic solvent at a concentration of 1-10 wt. %.

18. The method according to claim 1, wherein said at least one polymer is dissolved in said organic solvent at a concentration of 1-8 wt. %.

19. The method according to claim 1, wherein said at least one polymer is dissolved in said organic solvent at a concentration of 2-6 wt. %.

20. The method according to claim 1, wherein said photoinitiator and said crosslinking agent are present in said photoinitiator/crosslinking agent solution in a weight ratio of 1:4 to 1:9.

* * * * *